United States Patent
Steffens et al.

(10) Patent No.: US 6,533,942 B2
(45) Date of Patent: Mar. 18, 2003

(54) COOLING TOWER WATER CLEANING SYSTEM

(75) Inventors: Dale E. Steffens, Dallas, TX (US); James H. Joyner, Coppell, TX (US); Boyd R. Waddle, Carrollton, TX (US)

(73) Assignee: TLC Envirotech, Inc., Dallas, TX (US)

( * ) Notice: Subject to any disclaimer, the term of this patent is extended or adjusted under 35 U.S.C. 154(b) by 0 days.

(21) Appl. No.: 09/978,885

(22) Filed: Oct. 16, 2001

(65) Prior Publication Data

US 2002/0070178 A1 Jun. 13, 2002

Related U.S. Application Data

(62) Division of application No. 09/620,945, filed on Jul. 21, 2000, now Pat. No. 6,332,979.

(51) Int. Cl.[7] ................................................. C02F 1/461
(52) U.S. Cl. ....................... 210/696; 205/743; 205/745; 205/751; 210/743; 210/746; 210/748; 210/752; 210/764
(58) Field of Search ................................. 210/696, 743, 210/746, 752, 764, 96.1, 101, 143, 167, 195.1, 192, 199, 205, 748; 204/248; 205/745, 743, 751

(56) References Cited

U.S. PATENT DOCUMENTS

| | | | | |
|---|---|---|---|---|
| 4,472,283 A | * | 9/1984 | Brooks | 210/698 |
| 4,492,618 A | * | 1/1985 | Eder | 204/293 |
| 4,525,253 A | * | 6/1985 | Hayes et al. | 204/229.2 |
| 4,547,294 A | * | 10/1985 | Goeldner | 210/697 |
| 4,813,240 A | * | 3/1989 | Hon | 62/171 |
| 4,931,187 A | * | 6/1990 | Derham et al. | 210/662 |
| 5,364,508 A | * | 11/1994 | Weres et al. | 205/334 |
| 5,415,783 A | * | 5/1995 | Johnson et al. | 210/698 |
| 5,603,843 A | * | 2/1997 | Snee | 205/743 |
| 5,611,933 A | * | 3/1997 | Cleveland | 210/167 |
| 5,720,884 A | * | 2/1998 | Wallace et al. | 210/696 |
| 5,753,100 A | * | 5/1998 | Lumsden | 204/272 |
| 5,895,565 A | * | 4/1999 | Steininger et al. | 210/149 |
| 6,096,221 A | * | 8/2000 | Kerchouche et al. | 210/696 |
| 6,277,288 B1 | * | 8/2001 | Gargas | 205/752 |
| 6,332,979 B1 | * | 12/2001 | Steffens et al. | 204/248 |

* cited by examiner

Primary Examiner—Peter A. Hruskoci
(74) Attorney, Agent, or Firm—Jenkens & Gilchrist

(57) ABSTRACT

A cooling tower water purification system uses an electrical cleaning method by passing water over or through an anode and a cathode. The pH of the water is monitored and adjusted using injected $CO_2$ gas. The water can also be mechanically filter to remove the now dead biofilm and biomass as well as any scale or other debris. An additional embodiment can use an additional device such as a water jet to "stir" the bottom of the cooling tower to increase the efficiency of the filter in removing any built up or remaining biomass, scale or the like.

6 Claims, 4 Drawing Sheets

Top View

Side View

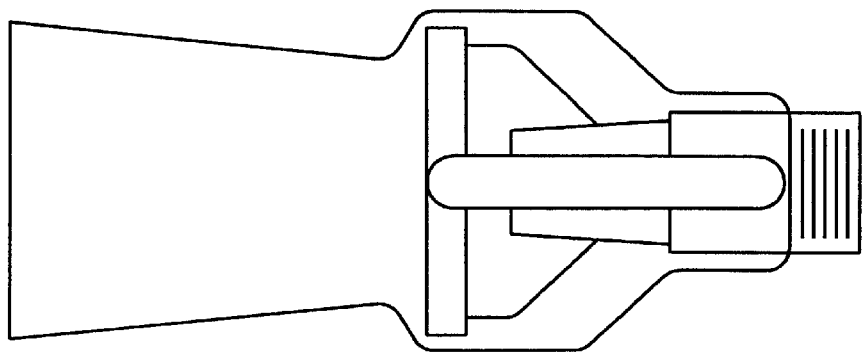
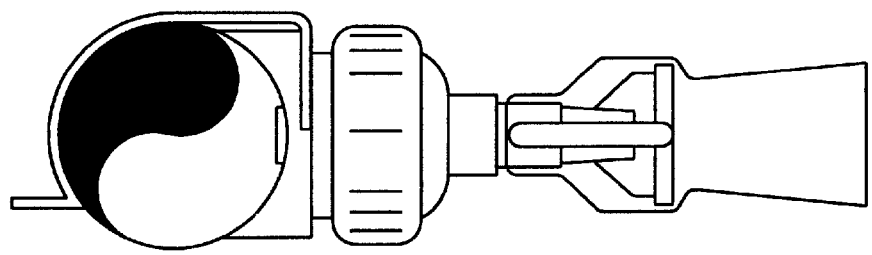
FIG. 4
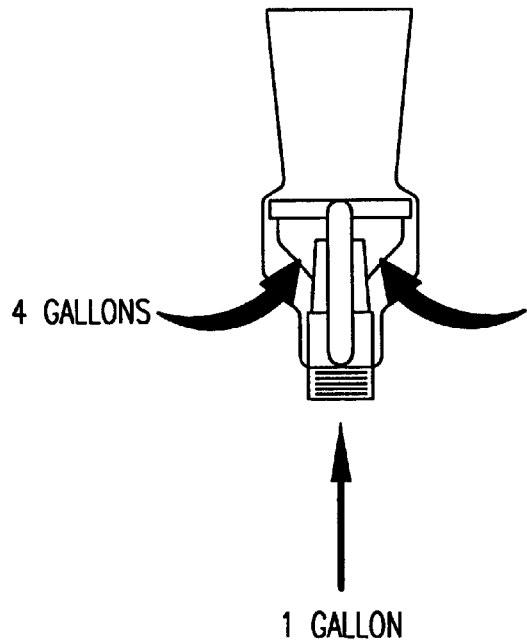

COOLING TOWER WATER CLEANING SYSTEM

This is a division of application Ser. No. 9/620,945 filed Jul. 21, 2000, now U.S. Pat. No. 6,332,979.

BACKGROUND OF THE INVENTION

1. Field of the Invention

The present invention relates to an automatic and improved non-chemical treatment system for the conditioning and cleaning of water. It has specific applicability in the cleaning of water for cooling towers without the need for conventional chemicals such as chlorine and the like.

2. Description of the Related Art

Various types of cooling towers are in use. These cooling towers generally use cooling water which may be used in such things as air conditioning systems, manufacturing processes and other operations that require a circulating loop of cool water, which is open to the air. The water used in these cooling towers must be cleaned or the cooling tower can lose efficiency and therefore waste energy. Problems have occurred in prior art systems for the cleaning of the water used in these systems in that they are generally chemical treatments. If the water is not treated, there is mineral build-up (scale), additional growth of this scale, biological growth (biofilm) and the growth of bacteria, algae, fungi and other viruses which might be present in the water. Various types of cooling have been attempted in the past for water used in other types of environments such as water purification systems used during the Apollo space mission or in swimming pools. Specifically, swimming pool water purification systems using ionization for swimming pools has been shown, for example, in Dadisman, U.S. Pat. No. 4,986,906; Dahlgren, U.S. Pat. No. 4,337,136; Eder U.S. Pat. No. 4,492,618; and Hayes, et al., U.S. Pat. No. 4,525,253. These apparatuses and methods suggest the purifying of water for use in, for example, swimming pools or drinking water by using metal ions created by connecting metal electrodes to a current source. However, the teachings found in swimming pools are not optimum for use in cooling towers, especially when the water is used in industrial processes and the additional chemicals such as chlorination or the like which may be added to swimming pool water may cause problems. Additionally, drinking water purification systems do not solve all the problems present in cooling tower cleaning systems.

Specifically, cooling tower water has a problem in that the pH can vary rather quickly as opposed to a swimming pool where the pH will not change rapidly but must be controlled. Accordingly, the prior art systems suffer from several problems. Furthermore, a pure ionic-type of clarification of the systems such as is shown in the Dahlgren, Eder and Hayes systems, have problems in that to control or to lower the amount of erosion and consequent plating of the electrodes, a reversing current is used. Dadisman attempts to solve this problem by using a constant current source being supplied to the electrodes. However, this does not allow for rapid adjustment of the amount of ionization that is provided by the electrodes and, therefore, is less than optimum.

Cooling tower water is continuously exposed to airborne and organic materials. The build up of bacteria, algae, fungi and viruses present hazards to the tower system and/or the health of the humans encountering the water. For example, it is believed that Legionnaires Disease was caused by the bacterium *Legionella pneumophila* which will thrive in cooling tower environments. High levels of bacteria also leads to possible microbial influenced corrosion which reduces the efficiency of the cooling tower and thereby wastes energy. Sulfate reducing and iron metabolizing bacteria also destroys iron piping. Moreover, a biofilm coating on a heat exchanger will reduce the heat transfer efficiency of the exchanger and is energy wasteful. The scale and biological deposits reduce the ability of refrigerant condensers and industrial process heat exchangers to transfer heat.

Further, the mineral build up which occurs in cooling towers must be addressed. Thermal and biological mechanisms support the build up of scale deposits of minerals such as calcium and magnesium which are commonly dissolved solids in almost any type of municipal water. As the water in the tower evaporates, these dissolved solids concentrate in the recirculating water and increase in concentration. Biofilms also start to form on the walls or other components of the tower. This causes the biofilm to act as an inherent for mineral micro crystals and over time the deposition of organic and inorganic matter increases the scale thickness, thereby exacerbating the problem and reducing the thermal and energy efficiency of the cooling tower. One major concern of cooling towers is the gradual corrosion of various parts of the tower. Much of the corrosion of cooling towers is associated with bacteria that can create conditions favoring microbiological induced corrosion.

Furthermore, the blow down water which is removed from a cooling tower must be disposed of. This blow down water, if sent down a municipal drain or disposed of manually, requires treatment which is energy wasteful and is expensive.

SUMMARY OF THE INVENTION

The present invention overcomes shortcomings and deficiencies noted above with respect to various ionic systems or chlorination systems by providing in an ionic system an automatically controlled stepped current to the cathode and anode of the ionic purification system. Additionally, pH is monitored and controlled during the processing and rather than having to alter the ionization direction, $CO_2$ gas is added into the tower water through a bubbling system producing mild carbonic acid. This acid is used to lower the pH level of the water so as to place it back in the level which is optimum for the ionization system. This continuous monitoring of the pH and the amount of $CO_2$ injected provide significant improvements over prior art systems which have attempted to solely use the ionization as the means to control pH or an offline system is used to control the pH of the water. The combination of the $CO_2$ and the ionization provides a synergistic effect which allows for a continuous maintaining of the pH in the optimum range for the water to be purified by the ionic system.

This feature of this invention has an additional significant advantage over prior systems such as is shown by the Dadisman system by although using a non-alternating current uses a stepped or increased DC current on the electrodes. This allows the electrodes to have an almost instantaneous adjustment being provided to them so as to provide the optimum level of purification of the water.

BRIEF DESCRIPTION OF THE DRAWINGS

Other advantages and novel features of the present invention will be understood and appreciated by reference to the following detailed description of the invention taking in conjunction with the accompanying drawings in which:

FIG. 4 is a schematic view of the water jet which can optionally be used in one embodiment of this invention.

DETAILED DESCRIPTION OF THE INVENTION

Figure 1:
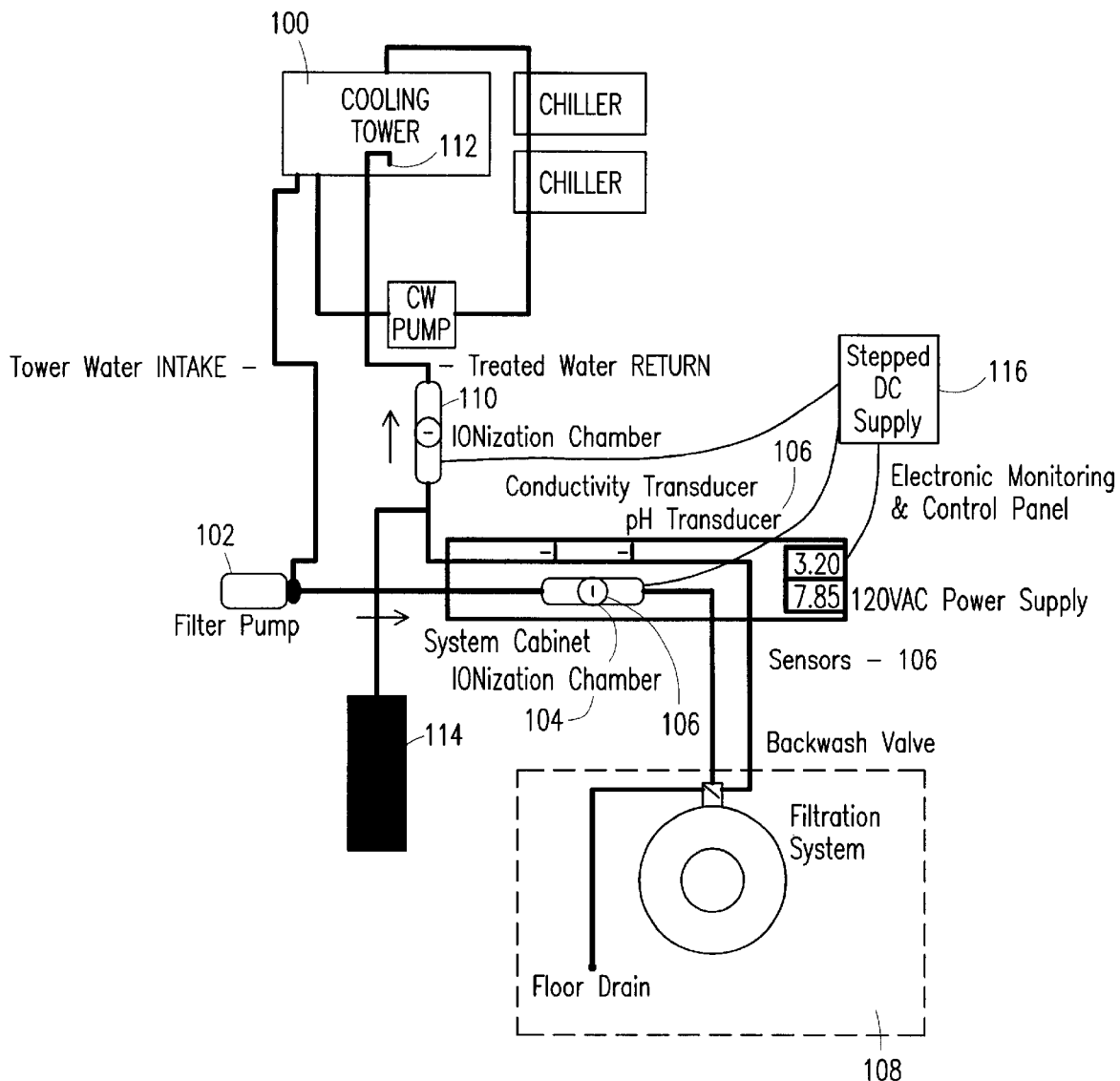
FIG. 1 is a block diagram of the system and which shows the water flow for this system.

Referring now to the drawings wherein like or similar elements are designated with identical reference numerals. In FIG. 1, it is seen that the cooling tower water is removed from the cooling tower 100 through a filter pump 102 and fed through an ionization chamber 104. At the ionization chamber or in the line immediately thereafter, a series of sensors 106 are used to detect the pH, the conductivity and the like. These sensor,can be a pH Transducer model pH3630, Conductivity model C3630, Conductivity sensor CS150TC and a pH sensor is S660CD all made by Sensorex. A Pressure Sensor MSI model MSP-300-100-P-5-N-1 can also be employed. Although these are the sensors employed in a test model built by the inventors herein it will be readily understood by one of ordinary skill in the art that the sensor need not be the same or even similar sensors so long as the various parameters can be acquired.

After the water leaves the ionization chamber, it is provided to a backwash system and manual filtration system 108 which can be used as an additional cleansing element or is directly provided back towards the cooling tower. An additional ionization chamber 110 can optionally be added. Still, further a jet such as in shown in FIG. 4 can be used to cause any debris, either from biomass, scale or otherwise is deliberately "stirred up" from the bottom of the cooling tower if the jet is placed in the return path where it returns water to the cooling tower 112. This use of a jet allows for additional mechanical filtering efficiency to be achieved.

Further, prior to arriving at the cooling tower, if necessary, $CO_2$ is injected into the system based upon determinations made by the pH transducer from a $CO_2$ injection system 114.

As cooling towers function to cool the circulating volume of water, the tower acts as a heat exchanger by driving ambient air through the falling water, causing some of the warm water to evaporate thereby giving off heat and providing cooling and then circulating the cooler water back through whatever equipment needs cooling such as a chiller condenser used in industrial processes. As noted above, typically chemicals such as chlorine and chelating agents are added to the cooling tower water to control the inevitable biological growth (which is called biofilm) and to inhibit mineral build-up called scale. This control of the biofilm and scale is necessary in maintaining the cooling tower heating efficiency. As the water volume in the tower is reduced through evaporation and drift, the concentration of these chemicals and their byproducts increases. The cooling towers also pickup contaminants from the ambient air. To maintain chemical and contaminate concentrations at a reasonable level, water is periodically removed from the system through a process called "blow down" or "bleed off." The blow down water and loss through evaporation and drift is replaced with fresh "make up" water. The requirement to use make up water is a significant cost and energy expenditure in that there is a great deal of cost in purifying the original "make up" water which is added to the cooling tower.

Figure 2:
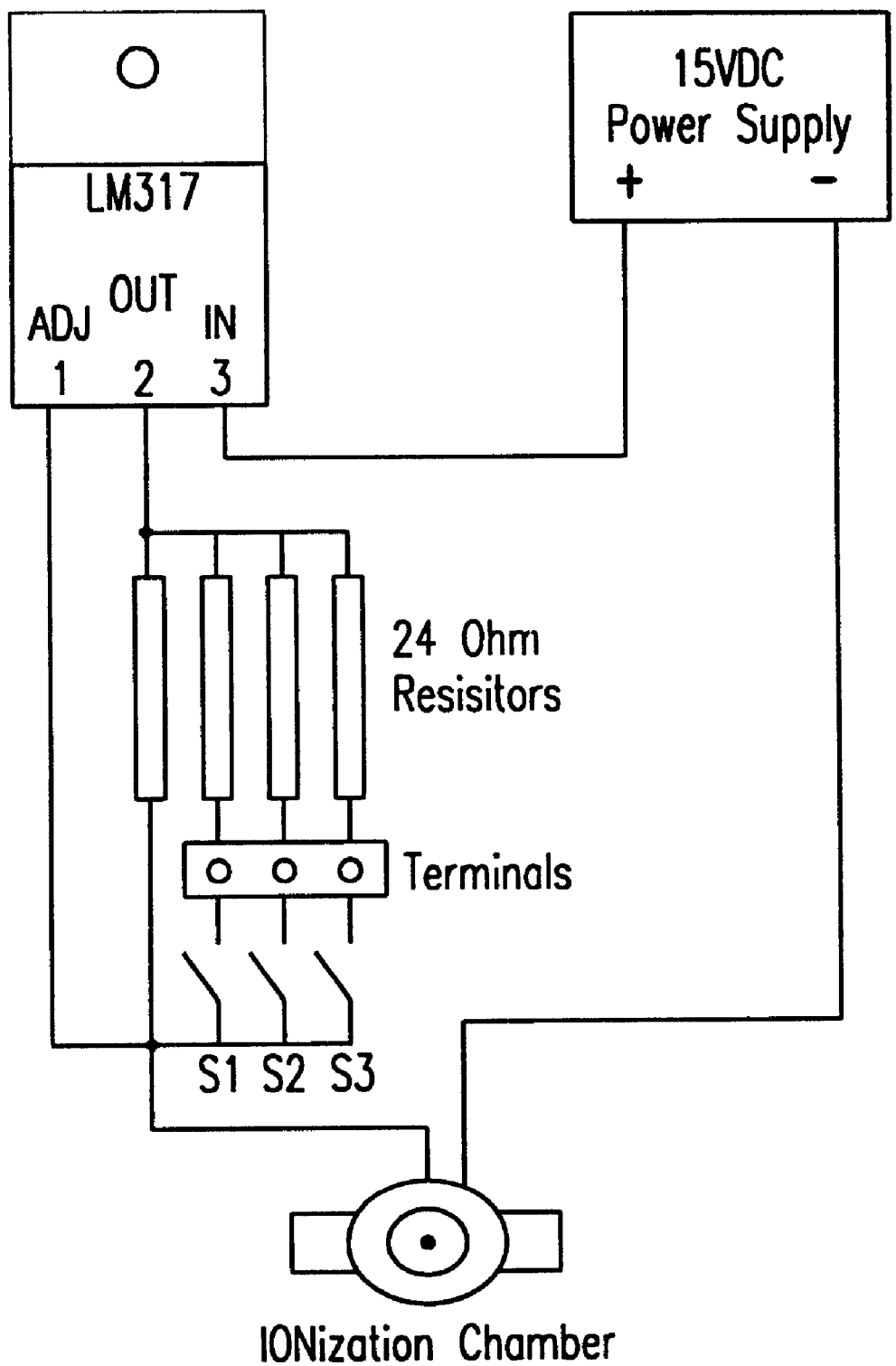
FIG. 2 is a schematic diagram of the electrical system used to provide a controlled stepped DC voltage to the anode and cathode used in this invention.

As shown in FIG. 1, when the water's conductivity reaches a set point level, the system's electronic control system sends a signal to the ion generation electrodes to adjust their ion output to increase or decrease the level oxidation being induced into the water system. This is provided by altering the direct current from the power supply shown as 116 in FIG. 1 to the electrodes in the ionization chamber 104 or chambers 104 and 110. A controllable DC power supply arrangement such as is shown in FIG. 2 can be employed, however one of ordinary skill will readily understand that any controllable/stepped DC supply can be used. The conductive measurement is sensed by the ionization sensor located in the water stream and determines the level of total dissolved solids (TDS) in the water which will vary as the electro conductivity of the water varies and is used as a control parameter to determine the level of oxidation necessary to clean the water. In normal operation, the range of conductivity goes from 1200 to 1600 micromhos/cm.

One of the other unique features of this invention is the ability to maintain pH control which allows the ionization process to operate at a maximum efficiency. Experimentally, it has been determined that a pH reading in the range of 7.5 and 8.5 is the optimum range. This system, by use of the pH sensor located at 106 in FIG. 1, makes the determination of the pH level of the returned water to the cooling tower. This monitoring is used to determine the amount of $CO_2$ which is provided back to the system by the $CO_2$ injection system 114 to control the ionization.

As noted above, the $CO_2$ injection process injects $CO_2$ ideally in gaseous form into the water which causes a mild carbonic acid to be formed. This injection of the $CO_2$ causing the carbonic acid to be formed lowers the pH of the water circulating. Normally, the pH will naturally rise if no $CO_2$ is injected into a straight ionization process.

Ideally, the $CO_2$ is injected at a range of 12.5 psi to 14 psi into the water. Based upon control signals provided by the monitoring that has been determined by the pH sensor. Experimentally, as noted above, it has been determined that a range of 7.5 to 8.5 for the pH is the ideal range for the ionization system to work.

Figure 3:
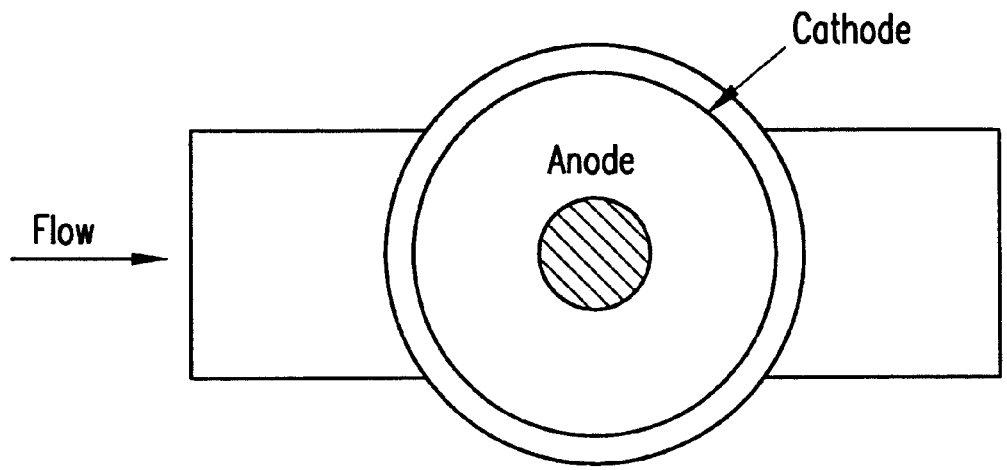
FIG. 3 shows a preferred arrangement of the anode and cathode in the water path.
Figure 3:
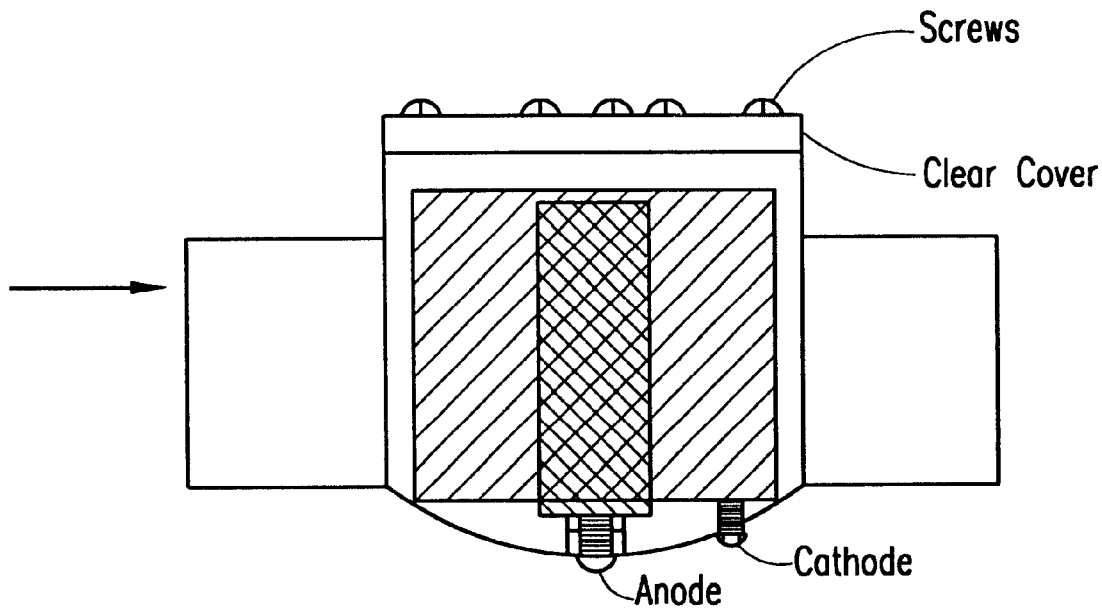

The ionization system uses a process of electrolysis or the passing of electrical current through the water to create metallic ions in the water. These ions are an atom or group of atoms that possess and electrical charge. The ionizer of this system works by passing a low DC current through a set of metallic electrodes (see FIG. 3) placed in line with the water circulation system and spaced slightly apart from each other. The voltage causes some of the outermost ions of the electrodes to lose electrons which attempt to flow across the space between the electrodes but instead are carried away by the rapidly moving water past the electrode. The rate of ion creation is proportional to the ration of copper/silver and stainless steel in these electrodes. The conductivity levels are monitored electronically by the system by sensors located at 106 in FIG. 1 and are controlled and adjusted by constantly changing the current flow across the electrodes within the ionization chamber or chambers.

This ionization of the water allows and causes the oxidation of organic material where in addition to producing ions the electrodes also electrolyze the water separating it into to ohms, hydrogen and oxygen. This ion generator oxidizes the biofilm which might possibly form and, which is noted above, is possible to serve as a binding agent which adhere scale to heat exchanger films. The ion generator loosens and removes the scale when the biofilm is present. Furthermore, polarized minerals in the water stay in solution and the existing scale will either soften or be eliminated entirely. This causes any attached minerals and particulate matter to be released into the flow where they are continuously filtered out of the water. This allows for an improvement in the heat transfer efficiency of the cooling tower.

As noted above prior art systems which have used just a straight DC current at a constant current level, such as the Dadisman system mentioned above, suffer from the problem in that the optimum current may have to be stepped at various times or adjusted based upon the sense level of ionization of the water as sensed, for example, by a sensor located at 106 as shown in FIG. 1. However, the Dadisman system specifically requires the use of a constant current system which is impossible to run at an optimum level and less than optimum engineering tradeoffs must be made as to the appropriate level of current to be supplied to the cathode and anode. Furthermore, as the cathodes and anodes age, the amount of current may need to be altered so as to maintain even a baseline efficiency. Accordingly, a circuit such as is shown in FIG. 2 is used to step the current based upon the level of ionization that is sensed by the sensor downstream from the ionization chamber. As this sensor measures in real time or essentially real time the water that has just passed the ionization chamber, it is possible to alter or step the current while maintaining a DC current on the cathode and anode and increase the efficiency of the ionization.

In summary the water purification of this invention can use several steps (however as should be noted not all embodiments of this invention would need all of these steps or may not need them in the order listed). Specifically in the currently known preferred embodiment the water is treated using.

1. An ionization process
2. An oxidation process
3. A filtration process
4. A $CO_2$ injection process All of the above processes are automated and alarmed. The ionization process differs from known prior art systems in a significant manner in that the current used for ionization although direct current is stepped or varied in voltage and current flow. The use of the $CO_2$ injection process in this type of environment is considered to be new, novel and a significant improvement over prior art systems.

Experimental test have shown this system has shown significant improvements over convnentual cleaning of water by use of chlorine or other chemicals. An independent test report entitled "TLC EnviroTech, Inc. Park City Baptist Church 24 Hour Acute Biomonitoring Report, *Daphinia pulex Pimephales promelas*, Apr. 26, 2000" conducted on an experimental test non-commercial system and incorporated by reference herein.

Although both a preferred embodiment and alternative versions of this embodiment with optional items of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for treating cooling tower water comprising the steps of:

passing the water through an ionization chamber including a cathode and an anode, wherein said cathode and anode are supplied with an electically controllable stepped direct current source, to purify said water;

monitoring the pH of the water passed over said anode and cathode and providing an adjusting signal based on the so monitored water;

injecting a gas into said monitored water to adjust the pH of said water based on said adjusting signal;

monitoring the conductivity of water passed over said anode and said cathode and altering the current supplied by said electrically controllable direct current source in part in response to said monitored conductivity to optimize water purification, and filtering said water to remove particulate matter.

2. A method as in claim 1 further comprising the step of: filtering said water to remove any dead biomass.

3. A method as in claim 1 further comprising the step of: filtering said water to remove any scale.

4. A method as in claim 1 further comprising the step of: filtering said water to remove any air-borne material.

5. A method as in claim 1 wherein said injected gas is $CO_2$.

6. A method as in claim 1 wherein said injected gas is $CO_2$ and wherein the said $CO_2$ is injected at a pressure of between 12.5 psi to 14 psi.

* * * * *